(12) United States Patent
Zhang et al.

(10) Patent No.: US 10,320,607 B2
(45) Date of Patent: Jun. 11, 2019

(54) DATA TRANSMISSION METHOD, FORWARDING INFORMATION UPDATE METHOD, COMMUNICATIONS DEVICE, AND CONTROLLER

(71) Applicant: Huawei Technologies Co., Ltd., Shenzhen (CN)

(72) Inventors: Wei Zhang, Shanghai (CN); Jinfang Zhang, Shanghai (CN); Chenghui Peng, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/338,119

(22) Filed: Oct. 28, 2016

(65) Prior Publication Data

US 2017/0048105 A1 Feb. 16, 2017

Related U.S. Application Data

(63) Continuation of application No. PCT/CN2014/076555, filed on Apr. 30, 2014.

(51) Int. Cl.
*H04L 12/24* (2006.01)
*H04L 12/781* (2013.01)
(Continued)

(52) U.S. Cl.
CPC ...... *H04L 41/0803* (2013.01); *H04L 12/1407* (2013.01); *H04L 41/12* (2013.01);
(Continued)

(58) Field of Classification Search
CPC ....... H04L 12/14; H04L 12/1407; H04W 4/24
See application file for complete search history.

(56) References Cited

U.S. PATENT DOCUMENTS 9,479,917 B1 * 10/2016 Gota ................ H04W 4/26
2007/0177622 A1 8/2007 Kim
(Continued)

FOREIGN PATENT DOCUMENTS

CN 101227409 A 7/2008
CN 101917670 A 12/2010
(Continued)

OTHER PUBLICATIONS

Open Networking Foundation, "OpenFlow Switch Specification," Version 1.3.4 (Protocol version 0x04), Mar. 27, 2014, 171 pages.
(Continued)

*Primary Examiner* — Raj Jain
(74) *Attorney, Agent, or Firm* — Slater Matsil, LLP

(57) ABSTRACT

Embodiments of the present invention provide a data transmission method, a forwarding information update method, a communications device, and a controller. The communications device includes: a forwarding module and one or more interfaces, where the forwarding module receives a data packet sent to a receive end; determines, according to a correspondence between data filtering template information of the data packet and interface information in forwarding information maintained by the forwarding module, an interface for forwarding the data packet to the receive end, where if data packet transmission is performed by using a specific radio access technology between the communications device and a next hop to which the communications device forwards the data packet, the interface is an interface corresponding to the radio access technology; and forwards the data packet to the interface; and the interface receives the data packet sent by the forwarding module, and forwards the data packet.

14 Claims, 7 Drawing Sheets

(51) Int. Cl.
*H04L 12/14* (2006.01)
*H04W 88/10* (2009.01)
*H04W 28/02* (2009.01)
*H04W 28/08* (2009.01)

(52) U.S. Cl.
CPC ......... *H04L 45/52* (2013.01); *H04W 28/0263* (2013.01); *H04W 88/10* (2013.01); *H04L 12/14* (2013.01); *H04W 28/08* (2013.01)

(56) References Cited

U.S. PATENT DOCUMENTS

| | | | |
|---|---|---|---|
| 2009/0245258 A1* | 10/2009 | Tanaka | H04L 45/22 370/392 |
| 2013/0007257 A1* | 1/2013 | Ramaraj | H04L 63/0263 709/224 |
| 2014/0269641 A1 | 9/2014 | Jang et al. | |
| 2017/0048105 A1* | 2/2017 | Zhang | H04L 41/0803 |

FOREIGN PATENT DOCUMENTS

| | | |
|---|---|---|
| WO | 2013066126 A1 | 5/2013 |
| WO | 2013177763 A1 | 12/2013 |

OTHER PUBLICATIONS

Pentikousis, K., et al., "MobileFlow: Toward Software-Defined Mobile Networks," Future Carrier Networks, IEEE Communications Magazine, Jul. 2013, 10 pages.

Open Networking Foundation, "OpenFlow Switch Specification," Version 1.2 (Wire Protocol 0x03), Dec. 5, 2011, 84 pages.

\* cited by examiner

DATA TRANSMISSION METHOD, FORWARDING INFORMATION UPDATE METHOD, COMMUNICATIONS DEVICE, AND CONTROLLER

CROSS-REFERENCE TO RELATED APPLICATIONS

This application is a continuation of International Patent Application No. PCT/CN2014/076555, filed on Apr. 30, 2014, the disclosure of which is hereby incorporated by reference in its entirety.

TECHNICAL FIELD

The present invention relates to the field of communications technologies, and in particular, to a data transmission method, a forwarding information update method, a communications device, and a controller.

BACKGROUND

When a data packet sent to a user is routed, according to the Internet Protocol (IP), to a packet data network gateway (PGW) to enter an operator network, a transmission process using the PGW as an example is as follows:

In a data transmission process, decapsulation is performed from a lower layer to an upper layer and encapsulation is performed from the upper layer to the lower layer. Therefore, when data is routed according to the IP to enter the PGW, decapsulation is started from the lower layer, that is, decapsulation is performed layer by layer from a link layer, a network layer, a transport layer and an application layer. After decapsulation is performed at an IP layer, destination address information is determined according to header information of a data packet, and then the data is transmitted to the transport layer. After decapsulation is performed at the transport layer, source port information and destination port information are determined, and then the data is sent to the application layer. Information about a bearer required for sending the data is determined at the application layer.

The PGW determines, in a data decapsulation process, information about a next hop to which the data is transmitted and logical channel information required for transmitting the data packet to the next hop. In this case, the PGW encapsulates the decapsulated data and then sends the encapsulated data to the next hop by using the bearer. A specific encapsulation process is as follows: GPRS Tunneling Protocol-User Plane (GTP-U) encapsulation is performed at the application layer; the data is sent to the transport layer for User Datagram Protocol (UDP) encapsulation, and then enters the network layer for IP encapsulation; then encapsulation at the link layer is performed; and finally, the data is transformed into an electrical signal and the electrical signal is transmitted at a physical layer.

However, this transmission manner results in a great waste of resources. In one aspect, a process in which the PGW or another network element in the network continuously performs encapsulation and decapsulation in the data transmission process results in huge processing overheads; in another aspect, addition of UDP/GTP-U encapsulation at an outer layer of the data packet increases at least 40 bytes of overheads, and for increasing small packet services in the future, such huge overheads may exceed a length of valid information, thereby resulting in huge transmission overheads.

SUMMARY

Embodiments of the present invention provide a data transmission method, a forwarding information update method, a communications device, and a controller, to reduce processing overheads and transmission overheads in a data transmission process. To achieve the foregoing objective, the following technical solutions are used in the embodiments of the present invention:

According to a first aspect, an embodiment of the present invention provides a communications device, where the communications device includes: a forwarding module and one or more interfaces. The forwarding module is configured to: receive a data packet sent to a receive end; determine, according to a correspondence between data filtering template information of the data packet and interface information in forwarding information maintained by the forwarding module, an interface for forwarding the data packet to the receive end, where if data packet transmission is performed by using a specific radio access technology between the communications device and a next hop to which the communications device forwards the data packet, the interface is an interface corresponding to the radio access technology; and forward the data packet to the interface. The interface is configured to: receive the data packet sent by the forwarding module; and forward the data packet.

With reference to the first aspect, in a first possible implementation manner, the receiving module is further configured to: receive forwarding update information sent by a controller, and send the forwarding update information to the forwarding module. The forwarding module is further configured to: receive the forwarding update information sent by the receiving module; and update the maintained forwarding information according to the forwarding update information.

With reference to the first aspect or the first possible implementation manner, in a second possible implementation manner, the interface is further configured to perform data link layer processing and physical layer processing on the received data packet.

With reference to the first aspect or either of the first possible implementation manner and the second possible implementation manner, in a third possible implementation manner, the forwarding information further includes bearer information of the data packet. The forwarding module is further configured to: determine, by using a correspondence between the data filtering template information of the data packet and the bearer information in the forwarding information, a bearer used for forwarding the data packet; attach a label to the data packet, where the label is used to identify that the data packet is forwarded by using the bearer; and send the data packet with the label to the interface. The interface is further configured to forward the data packet according to the label and by using the bearer.

According to a second aspect, an embodiment of the present invention provides a controller, where the controller includes: a decision module and a sending module. The decision module is configured to decide on forwarding information of a data packet sent to a receive end, where the forwarding information includes a correspondence between data filtering template information of the data packet and an interface of a communications device, and if data packet transmission is performed by using a specific radio access technology between the communications device and a next hop to which the communications device forwards the data packet, the interface is an interface corresponding to the radio access technology. The sending module is configured to send the forwarding information to the communications device.

With reference to the second aspect, in a first possible implementation manner, the communications device is a base station, and the receive end moves from a service range of a first base station to a service range of a second base station. The decision module is further configured to decide on first forwarding update information and second forwarding update information of the data packet sent to the receive end, where the first forwarding update information includes a correspondence between the data filtering template information of the data packet and a first interface of the first base station, so that the first base station sends the data packet to the second base station through the interface; and the second forwarding update message includes a correspondence between the data filtering template information of the data packet and a second interface of the second base station, so that the second base station sends the data packet to the receive end through the second interface. The sending module is further configured to: send the first forwarding update information to the first base station, and send the second forwarding update information to the second base station.

With reference to the first possible implementation manner, in a second possible implementation manner, the decision module is further configured to: when a preset trigger condition is met, decide on forwarding update information of data packets sent to all receive ends in a network managed by the controller, where the forwarding update information includes the correspondence between the data filtering template information of the data packet and the interface of the communications device. The sending module is further configured to send the forwarding update information to all communications devices in the network managed by the controller.

With reference to the second possible implementation manner, in a third possible implementation manner, the preset trigger condition is set according to a preset update period and/or a load status of communications devices in the network managed by the controller.

With reference to the second aspect or any one of the first possible implementation manner to the third possible implementation manner, in a fourth possible implementation manner, the decision module is further configured to decide on bearer information for sending the data packet, where the bearer information includes a correspondence between the data filtering template information of the data packet and the bearer information for sending the data packet. The sending module is further configured to send the bearer information to the communications device.

According to a third aspect, an embodiment of the present invention provides a data transmission method, where the method includes receiving a data packet sent to a receive end, and determining, according to a correspondence between data filtering template information of the data packet and interface information in maintained forwarding information, an interface for forwarding the data packet to the receive end, where if data packet transmission is performed by using a specific radio access technology between the communications device and a next hop to which the communications device forwards the data packet, the interface is an interface corresponding to the radio access technology. The method further includes forwarding the data packet to the interface and forwarding the data packet through the interface.

With reference to the third aspect, in a first possible implementation manner, the method further includes receiving forwarding update information sent by a controller; and updating the maintained forwarding information according to the forwarding update information.

With reference to the third aspect or the first possible implementation manner, in a second possible implementation manner, before the forwarding the data packet through the interface, the method further includes performing data link layer processing and physical layer processing on the received data packet.

With reference to the third aspect or either of the first possible implementation manner and the second possible implementation manner, in a third possible implementation manner, after the receiving a data packet sent to a receive end. The method further includes determining, by using a correspondence between the data filtering template information of the data packet and bearer information in the forwarding information, a bearer used for forwarding the data packet. The method further includes attaching a label to the data packet, where the label is used to identify that the data packet is forwarded by using the bearer; and after the determining, according to a correspondence between data filtering template information of the data packet and interface information in maintained forwarding information, an interface for forwarding the data packet to the receive end. The method further includes sending the data packet with the label to the interface; and forwarding the data packet through the interface according to the label and by using the bearer.

According to a fourth aspect, an embodiment of the present invention provides a forwarding information update method, where the method includes deciding on forwarding information of a data packet sent to a receive end, where the forwarding information includes a correspondence between data filtering template information of the data packet and an interface of a communications device, and if data packet transmission is performed by using a specific radio access technology between the communications device and a next hop to which the communications device forwards the data packet, the interface is an interface corresponding to the radio access technology. The method further includes sending the forwarding information to the communications device.

With reference to the fourth aspect, in a first possible implementation manner, the communications device is a base station, the receive end moves from a service range of a first base station to a service range of a second base station. The method further includes deciding on first forwarding update information and second forwarding update information of the data packet sent to the receive end, where the first forwarding update information includes a correspondence between the data filtering template information of the data packet and a first interface of the first base station, so that the first base station sends the data packet to the second base station through the interface; and the second forwarding update message includes a correspondence between the data filtering template information of the data packet and a second interface of the second base station, so that the second base station sends the data packet to the receive end through the second interface. The method further includes sending the first forwarding update information to the first base station, and sending the second forwarding update information to the second base station.

With reference to the first possible implementation manner, in a second possible implementation manner, after the sending the first forwarding update information to the first base station, and sending the second forwarding update information to the second base station, the method further includes when a preset trigger condition is met, deciding on forwarding update information of data packets sent to all receive ends in a network managed by a controller, where the forwarding update information includes the correspondence between the data filtering template information of the data packet and the interface of the communications device. The method further includes sending the forwarding update information to all communications devices in the network managed by the controller.

With reference to the second possible implementation manner, in a third possible implementation manner, the preset trigger condition is set according to a preset update period and/or a load status of communications devices in the network managed by the controller.

With reference to the fourth aspect or any one of the first possible implementation manner to the third possible implementation manner, in a fourth possible implementation manner, the method further includes deciding on bearer information for sending the data packet, where the bearer information includes a correspondence between the data filtering template information of the data packet and the bearer information for sending the data packet. The method further includes sending the bearer information to the communications device.

According to a fifth aspect, an embodiment of the present invention provides a communications device, where the communications device includes: a receiver, a processor, and a transmitter. The receiver is configured to receive a data packet sent to a receive end. The processor is configured to determine, according to a correspondence between data filtering template information of the data packet and interface information in maintained forwarding information, an interface for forwarding the data packet to the receive end, where if data packet transmission is performed by using a specific radio access technology between the communications device and a next hop to which the communications device forwards the data packet, the interface is an interface corresponding to the radio access technology. The transmitter is configured to: forward the data packet to the interface, and forward the data packet through the interface.

With reference to the fifth aspect, in a first possible implementation manner, the receiver is further configured to receive forwarding update information sent by a controller. The processor is further configured to update the maintained forwarding information according to the forwarding update information.

With reference to the fifth aspect or the first possible implementation manner, in a second possible implementation manner, the processor is further configured to perform data link layer processing and physical layer processing on the received data packet.

With reference to the fifth aspect or either of the first possible implementation manner and the second possible implementation manner, in a third possible implementation manner, the processor is further configured to: determine, by using a correspondence between the data filtering template information of the data packet and bearer information in the forwarding information, a bearer used for forwarding the data packet; and attach a label to the data packet, where the label is used to identify that the data packet is forwarded by using the bearer. The transmitter is further configured to: send the data packet with the label to the interface, and forward the data packet through the interface by using the bearer.

According to a sixth aspect, an embodiment of the present invention provides a controller, where the controller includes: a processor and a transmitter. The processor is configured to decide on forwarding information of a data packet sent to a receive end, where the forwarding information includes a correspondence between data filtering template information of the data packet and an interface of a communications device, and if data packet transmission is performed by using a specific radio access technology between the communications device and a next hop to which the communications device forwards the data packet, the interface is an interface corresponding to the radio access technology. The transmitter is configured to send the forwarding information to the communications device.

With reference to the sixth aspect, in a first possible implementation manner, the communications device is a base station, and the receive end moves from a service range of a first base station to a service range of a second base station. The processor is further configured to decide on first forwarding update information and second forwarding update information of the data packet sent to the receive end, where the first forwarding update information includes a correspondence between the data filtering template information of the data packet and a first interface of the first base station, so that the first base station sends the data packet to the second base station through the interface; and the second forwarding update message includes a correspondence between the data filtering template information of the data packet and a second interface of the second base station, so that the second base station sends the data packet to the receive end through the second interface. The transmitter is further configured to: send the first forwarding update information to the first base station, and send the second forwarding update information to the second base station.

With reference to the first possible implementation manner, in a second possible implementation manner, the processor is further configured to: when a preset trigger condition is met, decide on forwarding update information of data packets sent to all receive ends in a network managed by the controller, where the forwarding update information includes the correspondence between the data filtering template information of the data packet and the interface of the communications device. The transmitter is further configured to send the forwarding update information to all communications devices in the network managed by the controller.

With reference to the second possible implementation manner, in a third possible implementation manner, the preset trigger condition is set according to a preset update period and/or a load status of communications devices in the network managed by the controller.

With reference to the sixth aspect or any one of the first possible implementation manner to the third possible implementation manner, in a fourth possible implementation manner, the processor is further configured to decide on bearer information for sending the data packet, where the bearer information includes a correspondence between the data filtering template information of the data packet and the bearer information for sending the data packet. The transmitter is further configured to send the bearer information to the communications device.

The embodiments of the present invention provide a data transmission method, a forwarding information update method, a communications device, and a controller. The communications device includes: a forwarding module and one or more interfaces, where the forwarding module receives a data packet sent to a receive end; determines, according to a correspondence between data filtering template information of the data packet and interface information in forwarding information maintained by the forwarding module, an interface for forwarding the data packet to the receive end, where if data packet transmission is performed by using a specific radio access technology between the communications device and a next hop to which the communications device forwards the data packet, the interface is an interface corresponding to the radio access technology; and forwards the data packet to the interface; and the interface receives the data packet sent by the forwarding module, and forwards the data packet. The communications device maintains a piece of forwarding information in the forwarding module, matches the data filtering template information of the received data packet with the forwarding information, and determines the interface for forwarding the data packet. Therefore, encapsulation and decapsulation processes at a layer upper than an IP layer are avoided, and data transmission overheads and data processing overheads are reduced. In addition, if data packet transmission is performed by using the specific radio access technology between the communications device and the next hop to which the communications device forwards the data packet, the interface is the interface corresponding to the radio access technology. In this manner, data transmission using multiple radio access technologies is supported, and transmission efficiency of different services in different standards or load statuses of different standards are considered, so that data transmission efficiency is improved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

For a network in a standard such as a 3rd Generation Mobile Communication technology (3G) or a Long Term Evolution technology (LTE/LTE-A), network devices such as a packet data network gateway PGW, a serving gateway (SGW), a mobility management entity (MME), and a base station (Evolved Node B, ENodeB) in the network serve a user. Downlink data transmission in an LTE network is used as an example. After data sent to a terminal enters the network by using a packet data network gateway PGW, the packet data network gateway sends the data to a serving gateway SGW in which the terminal is located, the SGW sends the data to a base station to which the terminal is connected, and then the base station sends the data to the terminal, so that entire downlink data transmission is complete.

Figure 1:
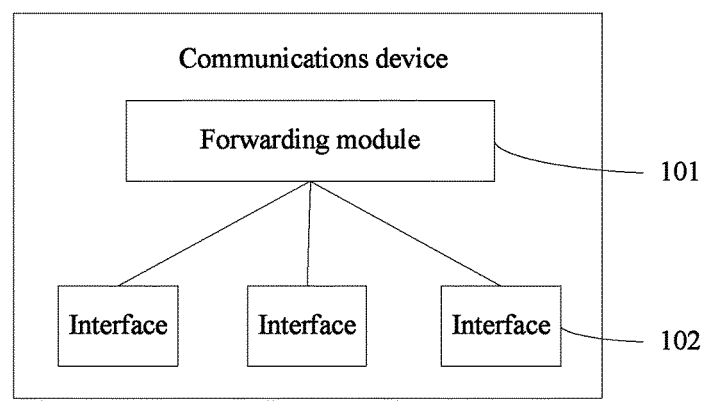
FIG. 1 is a schematic diagram of a communications device.

In the prior art, data transmission is performed according to a communications protocol, resulting in a large quantity of transmission overheads and processing overheads in a transmission process. To resolve this problem, an embodiment of the present invention provides a communications device, where the communications device is a network element that transmits data in a 3G/LTE network. With reference to FIG. 1, the communications device includes: a forwarding module 101 and one or more interfaces 102.

The forwarding module 101 is configured to: receive a data packet sent to a receive end; determine, according to a correspondence between data filtering template information of the data packet and interface information in forwarding information maintained by the forwarding module, an interface 102 for forwarding the data packet to the receive end, where if data packet transmission is performed by using a specific radio access technology between the communications device and a next hop to which the communications device forwards the data packet, the interface 102 is an interface 102 corresponding to the radio access technology; and forward the data packet to the interface 102.

Specifically, using an LTE network standard as an example, the communications device may be a PGW, an SGW or a base station. When there is a data flow sent to the receive end, using downlink data transmission as an example, the receive end is a mobile terminal. Generally, a sending path of a data packet of the data flow is: PGW→SGW→base station that the mobile terminal accesses.

The PGW receives a data packet of the data flow. After receiving the data packet, a forwarding module of the PGW determines, according to a correspondence between data filtering template information of the data packet and interface information in forwarding information maintained by the forwarding module of the PGW, an interface for forwarding the data packet to the receive end.

The forwarding information includes the correspondence between the data filtering template information of the data packet and the interface information of the PGW, where the data filtering template information of the data packet is IP 5-tuple information, MPLS label information, VLAN label information, or the like in header information of the data packet. The forwarding module matches the data filtering template information of the data packet with the forwarding information maintained by the forwarding module, to obtain an interface corresponding to the data filtering template information.

Figure 2:
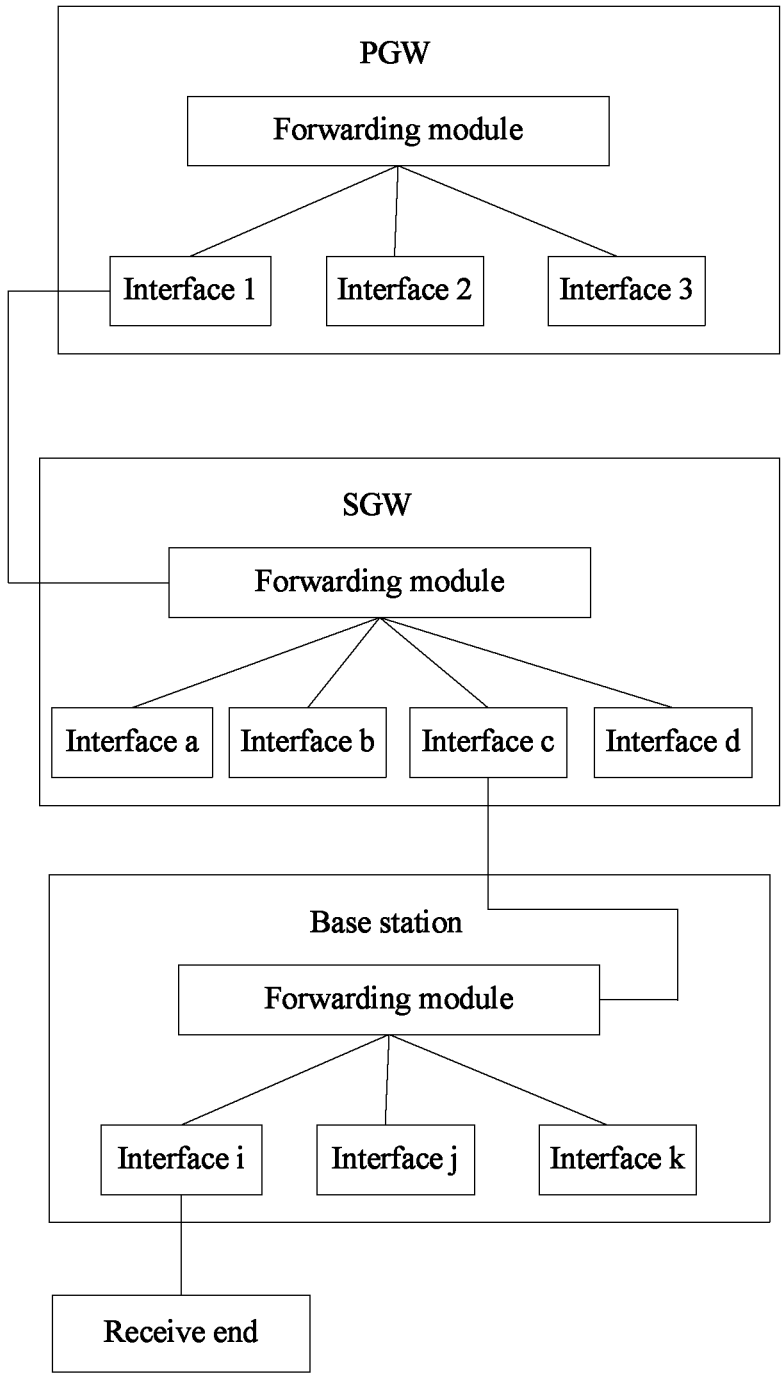
FIG. 2 is a schematic diagram of data transmission performed between communications devices.

For example, with reference to FIG. 2, the PGW has three interfaces, which are an interface 1, an interface 2, and an interface 3. After receiving a data packet, the forwarding module of the PGW matches data filtering template information of the data packet with the forwarding information maintained by the forwarding module of the PGW, to obtain a correspondence between the data filtering template information of the data packet and the interface 1; and the forwarding module of the PGW forwards the data packet to the interface 1.

After receiving the data packet, the interface 1 sends the data packet to the SGW, where the interface 1 of the PGW is connected to the SGW.

After receiving the data packet, a forwarding module of the SGW determines, according to a correspondence between the data filtering template information of the data packet and interface information in forwarding information maintained by the forwarding module of the SGW, an interface for forwarding the data packet to the receive end.

Specifically, with reference to FIG. 2, the SGW has four interfaces, which are an interface a, an interface b, an interface c, and an interface d. After receiving a data packet, the forwarding module of the SGW matches data filtering template information of the data packet with the forwarding information maintained by the forwarding module of the SGW, to obtain a correspondence between the data filtering template information of the data packet and the interface c; and the forwarding module of the SGW forwards the data packet to the interface c.

After receiving the data packet, the interface c sends the data packet to the base station, where the interface c is connected to the base station.

It should be noted that, the PGW is generally connected to the SGW by using a wireline access standard and the SGW is generally connected to the base station by using a wireline access standard.

Base stations may be connected by using a wireline access standard, or may be connected by using a radio access technology.

The base station is generally connected to the mobile terminal by using a radio access technology.

Specifically, the base stations may be connected by using multiple radio access technologies and the base station may be connected to the mobile terminal by using multiple radio access technologies, for example, an LTE radio access technology, a 5G radio access technology, a Wifi radio access technology, and an HSDPA radio access technology.

After receiving the data packet, a forwarding module of the base station determines, according to a correspondence between the data filtering template information of the data packet and interface information in forwarding information maintained by the forwarding module of the base station, an interface for forwarding the data packet to the receive end.

Specifically, with reference to FIG. 2, the base station has three interfaces, which are an interface i, an interface j, and an interface k. After receiving the data packet sent through the interface c of the SGW, the forwarding module of the base station matches the data filtering template information of the data packet with the forwarding information maintained by the forwarding module, to obtain a correspondence between the data filtering template information of the data packet and the interface i; and the forwarding module sends the data packet to the interface i.

It should be noted that, if data packet transmission is performed by using a specific radio access technology between the base station and a next hop to which the data packet is forwarded, the interface i is an interface corresponding to the radio access technology.

For example, the next hop of the base station is the receive end, the base station has multiple radio connection access, and the interface i, the interface j, and the interface k may respectively support radio access technologies 4G, 5G, and LTE.

When the receive end supports multi-standard data transmission, that is, when the receive end may be simultaneously connected to the base station by using at least two radio access technologies of 4G, 5G, and LTE, a controller in the LTE network decides on a transmission standard of a data flow sent to the receive end. For example, the controller decides that the transmission standard of the data flow sent to the receive end is the 4G radio access technology, and each data packet of the data flow is sent to the receive end by using the 4G radio access technology; then the controller sends a decision message to the base station, where the decision message includes a correspondence between data filtering template information of the data packet of the data flow and an interface of the base station, that is, the data filtering template information of the data packet of the data flow is corresponding to the interface i; and the base station maintains the decision message in the forwarding information in the forwarding module, determines a correspondence between the data packet and the interface i by matching the data filtering template information of the data packet of the data flow with the forwarding information, and sends, in a 4G transmission manner, the data packet to the receive end through the interface i.

Specifically, when the receive end may simultaneously access the base station by using at least two radio access technologies, the controller decides, according to transmission efficiency of different services in different standards, current load statuses of different technologies, or the like, which radio technology is used to transmit a data packet of a data flow.

Alternatively, when the receive end supports only one radio access technology, for example, the receive end can be connected to the base station only by using the 4G radio access technology, in this case, the controller decides that data packets of the data flow sent to the receive end are all transmitted in a 4G manner. The controller sends the decision message to the base station, where the decision message includes the correspondence between the data packet of the data flow and the interface i; and the base station maintains the decision message in the forwarding information in the forwarding module, matches the data filtering template information of the data packet with the forwarding information, determines the correspondence between the data packet and the interface i, forwards the data packet to the interface i, and sends the data packet to the receive end in a 4G manner.

Specifically, the forwarding modules of the PGW, the SGW, and the base station maintain a piece of forwarding information, where the forwarding information may be in a form of a forwarding information table, or may be in another form, which is not limited in this embodiment of the present invention.

Figure 3:
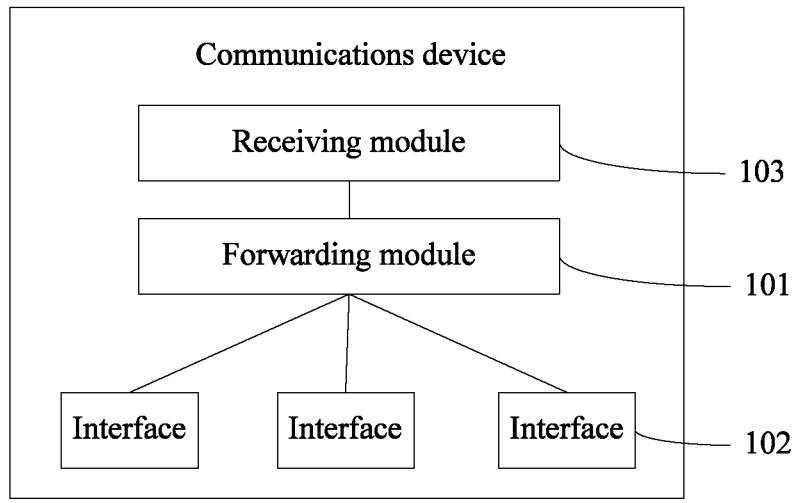
FIG. 3 is a schematic diagram of another communications device.

Further, because the receive end moves, using the LTE network as an example, when a mobile terminal enters the network, moves from a service range of a base station to a service range of another base station, or exits from the network, transmission of a data flow sent to the mobile terminal changes, that is, forwarding information maintained by forwarding modules of network elements, such as the PGW, the SGW, and the base station, used for transmitting data in the LTE network, needs to be continuously updated. Based on this, with reference to FIG. 3, the communications device further includes a receiving module 103.

The receiving module 103 is configured to: receive forwarding update information sent by a controller, and send the forwarding update information to the forwarding module 101.

The forwarding module 101 is further configured to: receive the forwarding update information sent by the receiving module 103, and update the maintained forwarding information according to the forwarding update information.

Specifically, before the interface 102 sends the data packet, the interface 102 is further configured to perform data link layer processing and physical layer processing on the data packet.

This embodiment of the present invention provides a communications device, where the communications device includes: a forwarding module and one or more interfaces, where the forwarding module receives a data packet sent to a receive end; determines, according to a correspondence between data filtering template information of the data packet and interface information in forwarding information maintained by the forwarding module, an interface for forwarding the data packet to the receive end, where if data packet transmission is performed by using a specific radio access technology between the communications device and a next hop to which the communications device forwards the data packet, the interface is an interface corresponding to the radio access technology; and forwards the data packet to the interface; and the interface receives the data packet sent by the forwarding module, and forwards the data packet. The communications device maintains a piece of forwarding information in the forwarding module, matches the data filtering template information of the received data packet with the forwarding information, and determines the interface for forwarding the data packet. Therefore, encapsulation and decapsulation processes at a layer upper than an IP layer are avoided, and data transmission overheads and data processing overheads are reduced. In addition, if data packet transmission is performed by using the specific radio access technology between the communications device and the next hop to which the communications device forwards the data packet, the interface is the interface corresponding to the radio access technology. In this manner, data transmission using multiple radio access technologies is supported, and transmission efficiency of different services in different standards or load statuses of different standards are considered, so that data transmission efficiency is improved.

Further, when the communications device is a base station, in order that when an interface of the base station forwards the data packet through a wireless air interface, data packets that belong to a same bearer are scheduled and transmitted through a logical channel of a same air interface according to unified quality of service (QoS), the forwarding module 101 is further configured to determine, by using a correspondence between the data filtering template information of the data packet and bearer information in the forwarding information, a bearer used for forwarding the data packet. The forwarding module 101 is further configured to attach a label to the data packet, where the label is used to identify that the data packet is forwarded by using the bearer.

For example, when the controller decides that a data packet of a data flow sent to a mobile terminal is sent through PGW→SGW→base station→mobile terminal, the controller decides on bearer information of the data flow, so that data packets of the data flow are transmitted by using a same bearer.

Specifically, the controller may send the bearer information of the data flow to any one of the three communications devices: the PGW, the SGW, and the base station. For example, the controller sends the bearer information of the data flow to the PGW, and the PGW maintains the bearer information in the forwarding information. After receiving the data packet of the data flow, the PGW determines, according to a correspondence between data filtering template information of the data packet and the bearer information in the forwarding information, a bearer used for transmitting the data packet, and then attaches a label to the data packet, where the label is used to identify that the data packet is forwarded by using the bearer.

Specifically, the label may be attached to a header of the data packet, or may be attached to another location of the data packet, which is not limited in this embodiment of the present invention.

When the data packet is sent to an interface of the base station, the interface of the base station determines, according to the label, which logical channel is used to forward the data packet.

Alternatively, the controller may send the bearer information to the SGW or the base station, and the SGW or the base station performs a labeling process.

The interface 102 is further configured to forward the data packet according to the label and by using the bearer.

After receiving the data packet with the label, the interface determines, according to the label, a bearer for transmitting the data packet, and forwards the data packet by using the bearer.

This embodiment of the present invention provides a communications device, where the communications device determines, by maintaining, in forwarding information, a correspondence between data filtering template information of a data packet and bearer information, a bearer for transmitting a data packet, so that data packets that belong to a same bearer are placed on a logical channel of a same air interface and are scheduled according to a unified quality of service requirement. Therefore, data transmission quality and data transmission efficiency are improved.

Figure 4:
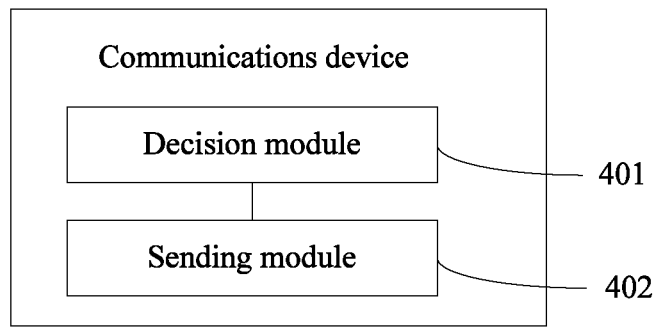
FIG. 4 is a schematic diagram of a controller.

An embodiment of the present invention provides a controller. With reference to FIG. 4, the controller includes: a decision module 401 and a sending module 402.

The decision module 401 is configured to decide on forwarding information of a data packet sent to a receive end, where the forwarding information includes a correspondence between data filtering template information of the data packet and an interface of a communications device, and if data packet transmission is performed by using a specific radio access technology between the communications device and a next hop to which the communications device forwards the data packet, the interface is an interface corresponding to the radio access technology.

The sending module 402 is configured to send the forwarding information to the communications device.

For example, the controller decides on a correspondence between a data packet of a data flow sent to the receive end and an interface of each communications device on a transmission path through which the data packet is transmitted to the receive end. For example, the controller decides that a data packet of a data flow sent to a mobile terminal is sent to the mobile terminal through a path: PGW→SGW→base station→mobile terminal, where the PGW has three interfaces, which are an interface 1, an interface 2, and an interface 3; the SGW has four interfaces, which are an interface a, an interface b, an interface c, and an interface d; and the base station has three interfaces, which are an interface i, an interface j, and an interface k. The controller decides that the PGW forwards the data packet of the data flow through the interface 1, the SGW forwards the data packet of the data flow through the interface c, and the base station forwards the data packet of the data flow through the interface i.

Based on this, forwarding information sent to the PGW by the controller is a correspondence between data filtering template information of the data packet of the data flow and the interface 1, forwarding information sent to the SGW by the controller is a correspondence between the data filtering template information of the data packet of the data flow and the interface c, and forwarding information sent to the base station by the controller is a correspondence between the data filtering template information of the data packet of the data flow and the interface i.

This embodiment of the present invention provides a controller, where the controller sends forwarding information to a communications device used for data transmission in a network managed by the controller, so that the communications device forwards, through the interface, a data packet by using a correspondence between data filtering template information of the data packet in the forwarding information and an interface of the communications device. Therefore, data encapsulation and decapsulation processes at a layer upper than an IP layer in a data packet transmission process are avoided, and data processing overheads and data transmission overheads are reduced. In addition, if data packet transmission is performed by using a specific radio access technology between the communications device and a next hop to which the communications device forwards the data packet, the interface obtained by using the forwarding information decided on by the controller is an interface corresponding to the radio access technology. According to this method, data transmission using multiple radio access technologies is supported, and transmission efficiency of different services in different standards or load statuses of different standards are considered, so that data transmission efficiency is improved.

Further, when a mobile terminal moves from a service range of a base station to a service range of another base station, the controller needs to decide on a new transmission path of a data flow transmitted to the mobile terminal. For example, after the mobile terminal moves from a service range of a first base station to a service range of a second base station, a transmission path of the data flow transmitted to the mobile terminal is changed from $PGW_1 \rightarrow SGW_1 \rightarrow$ first base station→mobile terminal to $PGW_2 \rightarrow SGW_2 \rightarrow$ second base station→mobile terminal. In this case, forwarding information of the $PGW_1$, the $SGW_1$, the first base station, the $PGW_2$, the $SGW_2$, and the second base station needs to be changed. When multiple mobile terminals in a network continuously move, forwarding information of global communications devices needs to be continuously changed, and a large amount of signaling interaction is generated in the network, resulting in an unstable network. To avoid this problem. The decision module 401 is further configured to decide on first forwarding update information and second forwarding update information of the data packet sent to the receive end. The first forwarding update information includes a correspondence between the data filtering template information of the data packet and a first interface of the first base station, so that the first base station sends the data packet to the second base station through the interface; and the second forwarding update message includes a correspondence between the data filtering template information of the data packet and a second interface of the second base station, so that the second base station sends the data packet to the receive end through the second interface.

The sending module 402 is further configured to: send the first forwarding update information to the first base station, and send the second forwarding update information to the second base station.

For example, if the first base station includes three interfaces, which are an interface 1i, an interface 1j, and an interface 1k, the interface 1i, the interface 1j, and the interface 1k may respectively support radio access technologies 4G, 5G, and LTE; and if the second base station also includes three interfaces, which are an interface 2i, an interface 2j, and an interface 2k, the interface 2i, the interface 2j, and the interface 2k may respectively support the radio access technologies 4G, 5G, and LTE.

If the second base station is connected to the first base station by using the 5G radio access technology, the first forwarding update information sent to the first base station by the controller is a correspondence between the data filtering template information of the data packet and the interface 1j, and the first base station forwards the data packet to the second base station through the interface 1j after receiving the data packet.

If the mobile terminal is connected to the second base station by using the 4G radio access technology, the second forwarding update information sent to the second base station by the controller is a correspondence between the data filtering template information of the data packet and the interface 2i, and the second base station forwards the data packet to the mobile terminal through the interface 2i.

In this case, a forwarding path of the data packet sent to the mobile terminal is $PGW_1 \rightarrow SGW_1 \rightarrow$ first base station-→second base station→mobile terminal.

Further, in order that a data transmission path achieves an optimal state, the decision module 401 is further configured to: when a preset trigger condition is met, decide on forwarding update information of data packets sent to all receive ends in a network managed by the controller. The forwarding update information includes the correspondence between the data filtering template information of the data packet and the interface of the communications device.

The sending module 402 is further configured to send the forwarding update information to all communications devices in the network managed by the controller.

When the mobile terminal moves from coverage of the first base station to coverage of the second base station, an optimal path through which the data packet sent to the mobile terminal is sent to the mobile terminal should be $PGW_2 \rightarrow SGW_2 \rightarrow$ second base station→mobile terminal. However, a current path through which the data packet is sent to the mobile terminal is $PGW_1 \rightarrow SGW_1 \rightarrow$ first base station→second base station→mobile terminal. According to the foregoing method, a case in which a large amount of signaling interaction results in an unstable network may be avoided, but the optimal path to the mobile terminal cannot be achieved. To resolve this problem, when the preset trigger condition is met, the controller may send the forwarding update information to all the communications devices in the network managed by the controller, so that the communications device updates maintained forwarding information according to the forwarding update information, so that an optimal data transmission path is achieved.

Specifically, the preset trigger condition is set according to a preset update period and/or a load status of communications devices in the network managed by the controller.

This embodiment of the present invention provides a controller, where when a mobile terminal moves from a service range of a first base station to a service range of a second base station, the controller first updates forwarding information of the first base station and the second base station, so that a data packet sent to the mobile terminal is sent to the second base station by using the first base station, and then is sent to the mobile terminal by the second base station. In this manner, a phenomenon that a large amount of signaling interaction caused by movement of the mobile terminal in a network results in an unstable network may be avoided. In addition, the controller periodically sends forwarding update information to all communications devices in a network managed by the controller, so that a path of the data packet sent to the mobile terminal achieves an optimal state.

Further, when the communications device is a base station, in order that when an interface of the base station forwards the data packet through a wireless air interface, data packets that belong to a same bearer are scheduled and transmitted through a logical channel of a same air interface according to unified quality of service (QoS), the decision module 401 is further configured to decide on bearer information for sending the data packet, where the bearer information includes a correspondence between the data filtering template information of the data packet and the bearer information for sending the data packet.

The sending module 402 is further configured to send the bearer information to the communications device.

Specifically, for detailed technical features of this embodiment of the present invention, reference may be made to technical features of the embodiment of the foregoing communications device, and details are not described in this embodiment of the present invention.

Figure 5:
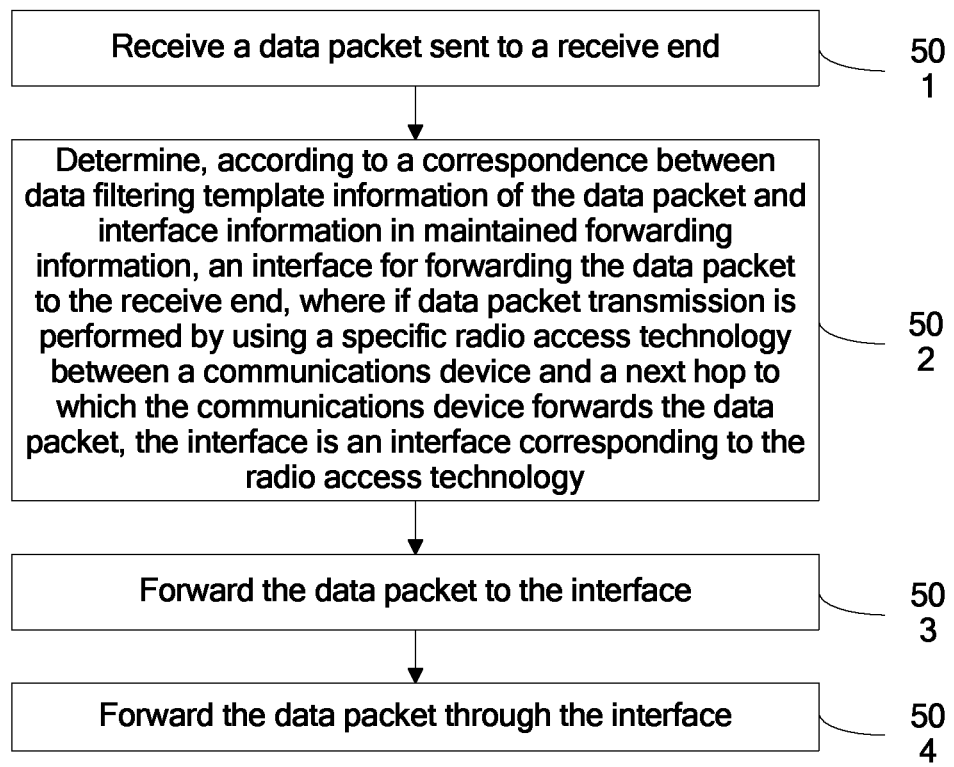
FIG. 5 is a flowchart of a data transmission method.

An embodiment of the present invention provides a data transmission method, where the method is executed by a communications device used for data transmission. With reference to FIG. 5, the method includes the following steps.

501. Receive a data packet sent to a receive end.

502. Determine, according to a correspondence between data filtering template information of the data packet and interface information in maintained forwarding information, an interface for forwarding the data packet to the receive end, where if data packet transmission is performed by using a specific radio access technology between the communications device and a next hop to which the communications device forwards the data packet, the interface is an interface corresponding to the radio access technology.

Specifically, the communications device further needs to receive forwarding update information sent by a controller in a network, and update the maintained forwarding information according to the forwarding update information.

503. Forward the data packet to the interface.

504. Forward the data packet through the interface.

Specifically, before forwarding the data packet, the interface further needs to perform data link layer processing and physical layer processing on the data packet.

This embodiment of the present invention provides a data transmission method, where in this method, a communications device matches a received data packet with maintained forwarding information, to obtain a corresponding interface that is of the communications device and that is used for transmitting the data packet; and forwards the data packet through the interface. In this manner, data encapsulation and decapsulation processes at a layer upper than an IP layer are avoided in a data transmission process, and processing overheads and transmission overheads are reduced in the data transmission process. In addition, according to this method, if data transmission is performed by using a specific radio access technology between the communications device and a next hop to which the data packet is forwarded, the interface is an interface corresponding to the radio access technology. In this manner, data transmission using multiple radio access technologies is supported, and transmission efficiency of different services in different standards or load statuses of different standards are considered, so that data transmission efficiency is improved.

Figure 6:
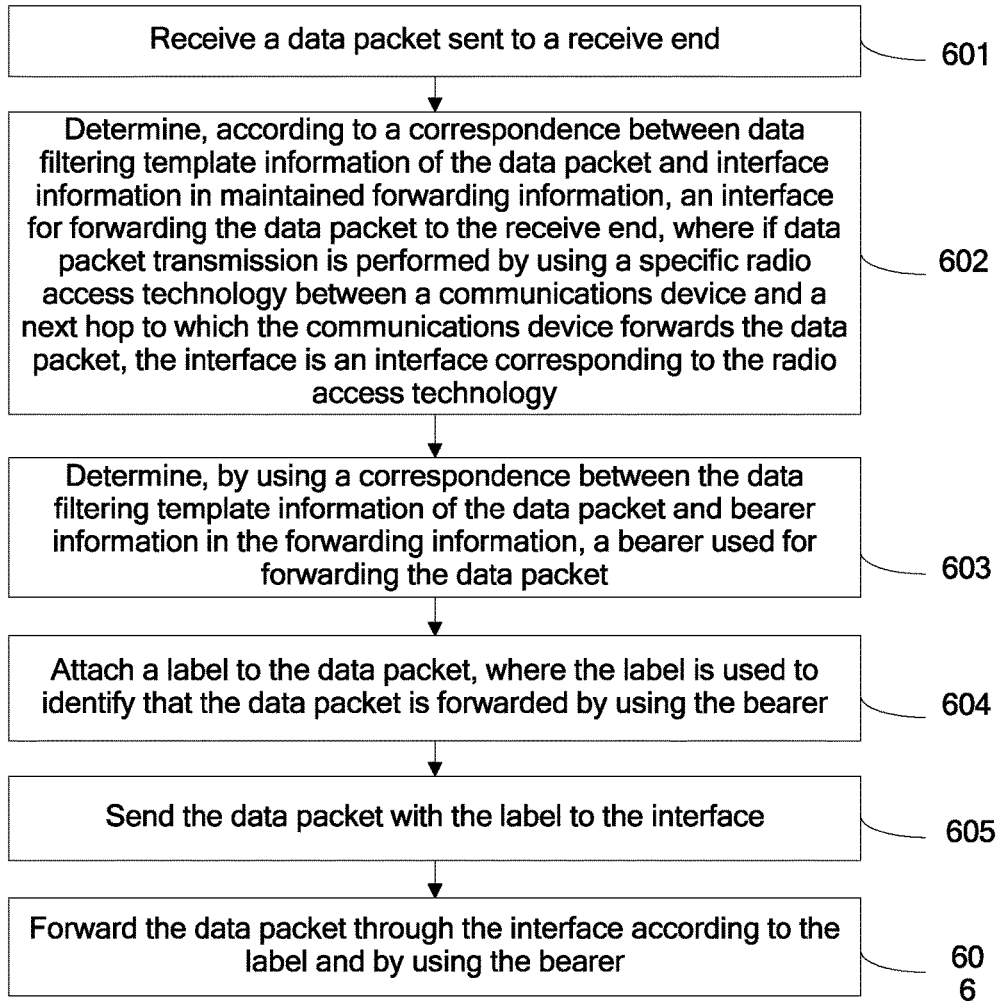
FIG. 6 is a flowchart of another data transmission method.

Further, when the communications device is a base station, in order that when an interface of the base station forwards the data packet through a wireless air interface, data packets that belong to a same bearer are scheduled and transmitted through a logical channel of a same air interface according to unified quality of service (QoS), an embodiment of the present invention further provides a data transmission method. With reference to FIG. 6, the method includes the following steps.

601. Receive a data packet sent to a receive end.

602. Determine, according to a correspondence between data filtering template information of the data packet and interface information in maintained forwarding information, an interface for forwarding the data packet to the receive end, where if data packet transmission is performed by using a specific radio access technology between the communications device and a next hop to which the communications device forwards the data packet, the interface is an interface corresponding to the radio access technology.

603. Determine, by using a correspondence between the data filtering template information of the data packet and bearer information in the forwarding information, a bearer used for forwarding the data packet.

604. Attach a label to the data packet, where the label is used to identify that the data packet is forwarded by using the bearer.

605. Send the data packet with the label to the interface.

606. Forward the data packet through the interface according to the label and by using the bearer.

Specifically, for a specific implementation process of the embodiment of the data transmission method provided in the present invention, reference may be made to a detailed implementation process of the embodiment of the foregoing communications device, and details are not described in this embodiment of the present invention.

This embodiment of the present invention provides a data transmission method. According to this method, data processing overheads and data transmission overheads can be reduced, and in addition, according to this method, data packets that belong to a same bearer can be placed on a logical channel of a same air interface and be scheduled and transmitted according to a unified quality of service criterion. Therefore, data transmission quality and data transmission efficiency are improved.

Figure 7:
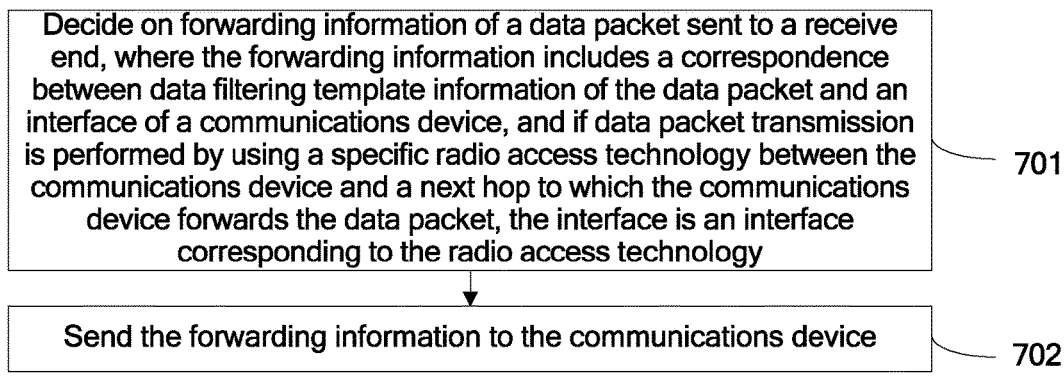
FIG. 7 is a flowchart of a forwarding information update method.

An embodiment of the present invention provides a forwarding information update method, where the method is executed by a controller. With reference to FIG. 7, the method includes the following steps.

701. Decide on forwarding information of a data packet sent to a receive end, where the forwarding information includes a correspondence between data filtering template information of the data packet and an interface of a communications device, and if data packet transmission is performed by using a specific radio access technology between the communications device and a next hop to which the communications device forwards the data packet, the interface is an interface corresponding to the radio access technology.

702. Send the forwarding information to the communications device.

This embodiment of the present invention provides a forwarding information update method, where in this method, the controller decides on forwarding information of each data packet of a data flow in consideration of factors such as a load status of each communications device in a network and a connection status of a mobile terminal, and sends the forwarding information to a communications device, so that the communications device updates forwarding information maintained by the communications device. The communications device may determine, by using the forwarding information and data filtering template information of a received data packet, a correspondence between the data packet and an interface of the communications device, and then forwards the data packet. In addition, if data packet transmission is performed by using a specific radio access technology between the communications device and a next hop to which the communications device forwards the data packet, the interface obtained by using the forwarding information decided on by the controller is an interface corresponding to the radio access technology. According to this method, data transmission using multiple radio access technologies is supported, and transmission efficiency of different services in different standards or load statuses of different standards are considered, so that data transmission efficiency is improved.

Figure 8:
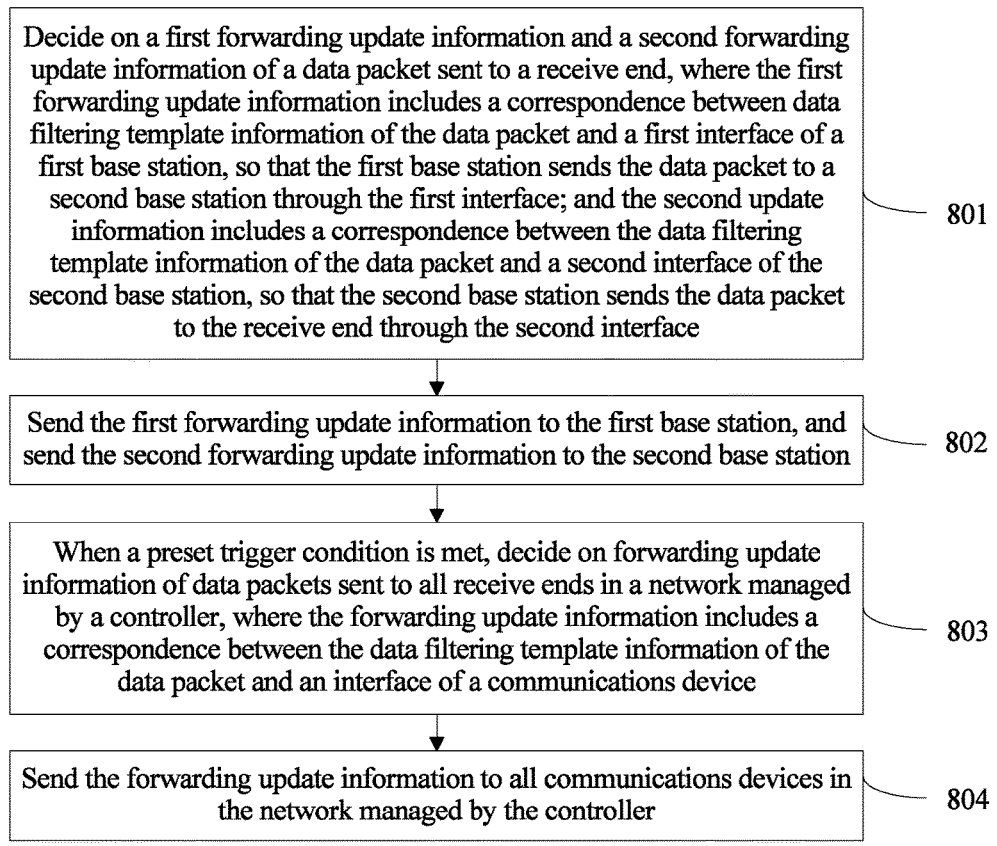
FIG. 8 is a flowchart of another forwarding information update method.

Further, when a mobile terminal moves from a service range of a base station to a service range of another base station, the controller needs to decide on a new transmission path of a data flow transmitted to the mobile terminal. For example, after the mobile terminal moves from a service azimuth of a first base station to a service range of a second base station, a transmission path of the data flow transmitted to the mobile terminal is changed from $PGW_1 \rightarrow SGW_1 \rightarrow$first base station$\rightarrow$mobile terminal to $PGW_2 \rightarrow SGW_2 \rightarrow$second base station$\rightarrow$mobile terminal. In this case, forwarding information of the $PGW_1$, the $SGW_1$, the first base station, the $PGW_2$, the $SGW_2$, and the second base station needs to be changed. When multiple mobile terminals in a network continuously move, forwarding information of global communications devices needs to be continuously changed, and a large amount of signaling interaction is generated in the network, resulting in an unstable network. To avoid this problem, with reference to FIG. 8, an embodiment of the present invention provides a forwarding information update method, where the method includes the following steps.

801. Decide on first forwarding update information and second forwarding update information of a data packet sent to the receive end, where the first forwarding update information includes a correspondence between data filtering template information of the data packet and a first interface of the first base station, so that the first base station sends the data packet to the second base station through the interface; and the second forwarding update message includes a correspondence between the data filtering template information of the data packet and a second interface of the second base station, so that the second base station sends the data packet to the receive end through the second interface.

802. Send the first forwarding update information to the first base station, and send the second forwarding update information to the second base station.

803. When a preset trigger condition is met, decide on forwarding update information of data packets sent to all receive ends in a network managed by the controller, where the forwarding update information includes a correspondence between the data filtering template information of the data packet and an interface of the communications device.

Specifically, the preset trigger condition is set according to a preset update period and/or a load status of communications devices in the network managed by the controller.

It should be noted that the trigger condition may also be preset according to another situation, in addition to the preset update period and/or the load status of communications devices in the network managed by the controller. Specifically, this embodiment of the present invention sets no limitation thereto.

804. Send the forwarding update information to all communications devices in the network managed by the controller.

Specifically, for detailed technical features of this embodiment of the present invention, reference may be made to detailed technical features of the embodiment of the foregoing controller, and details are not described in this embodiment of the present invention.

This embodiment of the present invention provides a forwarding information update method, where in this method, when a mobile terminal moves from a service range of a first base station to a service range of a second base station, the controller first updates forwarding information of the first base station and the second base station, and when a preset trigger condition is met, updates forwarding information of another communications device. Therefore, signaling interaction in a network is effectively reduced and a case of an unstable network is avoided.

Figure 9:
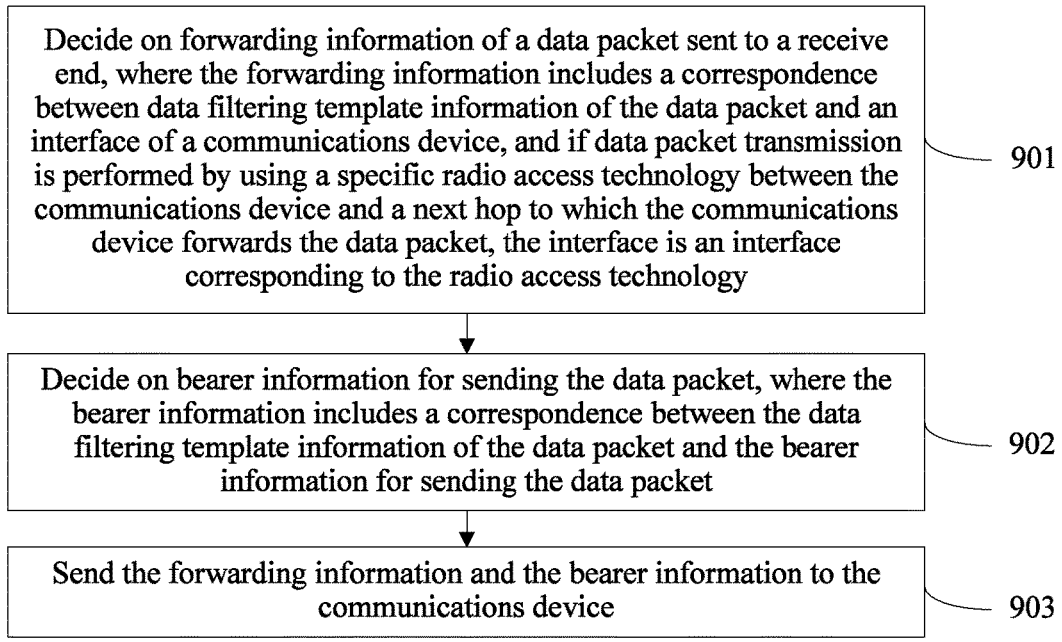
FIG. 9 is a flowchart of still another forwarding information update method.

Further, in order that when an interface of the base station forwards the data packet through a wireless air interface, data packets that belong to a same bearer are scheduled and transmitted through a logical channel of a same air interface according to unified quality of service (QoS), an embodiment of the present invention further provides a forwarding information update method. With reference to FIG. 9, the method includes the following steps.

901. Decide on forwarding information of a data packet sent to a receive end, where the forwarding information includes a correspondence between data filtering template information of the data packet and an interface of a communications device, and if data packet transmission is performed by using a specific radio access technology between the communications device and a next hop to which the communications device forwards the data packet, the interface is an interface corresponding to the radio access technology.

902. Decide on bearer information for sending the data packet, where the bearer information includes a correspondence between the data filtering template information of the data packet and the bearer information for sending the data packet.

903. Send the forwarding information and the bearer information to the communications device.

This embodiment of the present invention provides a forwarding information update method. According to this method, data processing overheads and data transmission overheads can be reduced, and in addition, a communications device can place, according to forwarding information sent by a controller, data packets that belong to a same bearer on a logical channel of a same air interface, and perform scheduling and transmission according to a unified quality of service criterion. Therefore, data transmission quality and data transmission efficiency are improved.

Figure 10:
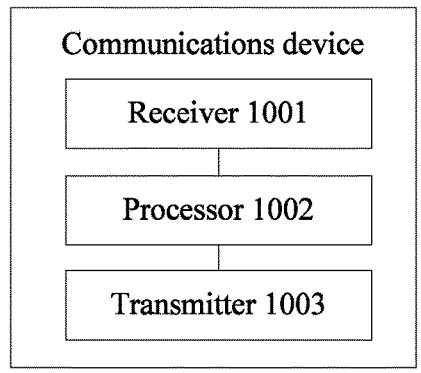
FIG. 10 is a schematic diagram of still another communications device.

An embodiment of the present invention provides a communications device. With reference to FIG. 10, the communications device includes: a receiver 1001, a processor 1002, and a transmitter 1003.

The receiver 1001 is configured to receive a data packet sent to a receive end.

The processor 1002 is configured to: determine, according to a correspondence between data filtering template information of the data packet and interface information in maintained forwarding information, an interface for forwarding the data packet to the receive end, where if data packet transmission is performed by using a specific radio access technology between the communications device and a next hop to which the communications device forwards the data packet, the interface is an interface corresponding to the radio access technology.

The transmitter 1003 is configured to: forward the data packet to the interface, and forward the data packet through the interface.

Specifically, the receiver 1001 is further configured to receive forwarding update information sent by a controller.

The processor 1002 is further configured to update the maintained forwarding information according to the forwarding update information.

Specifically, the processor 1002 is further configured to perform data link layer processing and physical layer processing on the received data packet.

Optionally, the processor 1002 is further configured to determine, by using a correspondence between the data filtering template information of the data packet and bearer information in the forwarding information, a bearer used for forwarding the data packet; and attach a label to the data packet, where the label is used to identify that the data packet is forwarded by using the bearer.

The transmitter 1003 is further configured to: send the data packet with the label to the interface; and forward the data packet through the interface by using the bearer.

Specifically, for specific technical features of the present invention, reference may be made to specific technical features of the embodiment of the communications device in the foregoing embodiment, and details are not described in this embodiment of the present invention.

This embodiment of the present invention provides a communications device, where the communications device maintains a piece of forwarding information, matches data filtering template information of a received data packet with the forwarding information, and determines an interface for forwarding the data packet. Therefore, encapsulation and decapsulation processes at a layer upper than an IP layer are avoided, and data transmission overheads and data processing overheads are reduced. In addition, if data packet transmission is performed by using a specific radio access technology between the communications device and a next hop to which the communications device forwards the data packet, the interface is an interface corresponding to the radio access technology. In this manner, data transmission using multiple radio access technologies is supported, and transmission efficiency of different services in different standards or load statuses of different standards are considered, so that data transmission efficiency is improved.

Figure 11:
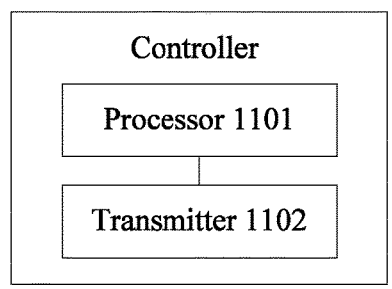
FIG. 11 is a schematic diagram of another controller.

An embodiment of the present invention provides a controller. With reference to FIG. 11, the controller includes: a processor 1101 and a transmitter 1102.

The processor 1101 is configured to decide on forwarding information of a data packet sent to a receive end, where the forwarding information includes a correspondence between data filtering template information of the data packet and an interface of a communications device, and if data packet transmission is performed by using a specific radio access technology between the communications device and a next hop to which the communications device forwards the data packet, the interface is an interface corresponding to the radio access technology.

The transmitter 1102 is configured to send the forwarding information to the communications device.

Specifically, the communications device is a base station, and the receive end moves from a service range of a first base station to a service range of a second base station. The processor 1101 is further configured to decide on first forwarding update information and second forwarding update information of the data packet sent to the receive end, where the first forwarding update information includes a correspondence between the data filtering template information of the data packet and a first interface of the first base station, so that the first base station sends the data packet to the second base station through the interface; and the second forwarding update message includes a correspondence between the data filtering template information of the data packet and a second interface of the second base station, so that the second base station sends the data packet to the receive end through the second interface.

The transmitter 1102 is further configured to: send the first forwarding update information to the first base station, and send the second forwarding update information to the second base station.

Specifically, the processor 1101 is further configured to: when a preset trigger condition is met, decide on forwarding update information of data packets sent to all receive ends in a network managed by the controller, where the forwarding update information includes the correspondence between the data filtering template information of the data packet and the interface of the communications device.

The transmitter 1102 is further configured to send the forwarding update information to all communications devices in the network managed by the controller.

Optionally, the preset trigger condition is set according to a preset update period and/or a load status of communications devices in the network managed by the controller.

Specifically, the processor 1101 is further configured to: decide on bearer information for sending the data packet, where the bearer information includes a correspondence between the data filtering template information of the data packet and the bearer information for sending the data packet.

The transmitter 1102 is further configured to send the bearer information to the communications device. For specific technical features of the present invention, reference may be made to specific technical features of the embodiment of the controller in the foregoing embodiment, and details are not described in this embodiment of the present invention.

This embodiment of the present invention provides a controller, where the controller sends forwarding information to a communications device used for data transmission in a network managed by the controller, where the forwarding information includes a correspondence between data filtering template information of a data packet and an interface of the communications device, so that the communications device matches, for the received data packet, the data filtering template information with the forwarding information, to obtain a corresponding interface; and forwards the data packet through the interface. In this manner, encapsulation and decapsulation processes of the data packet at a layer upper than an IP layer are reduced, and data processing overheads and data transmission overheads are reduced. In addition, if data packet transmission is performed by using a specific radio access technology between the communications device and a next hop to which the communications device forwards the data packet, the interface obtained by using the forwarding information decided on by the controller is an interface corresponding to the radio access technology. According to this method, data transmission using multiple radio access technologies is supported, and transmission efficiency of different services in different standards or load statuses of different standards are considered, so that data transmission efficiency is improved.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method comprising:
   receiving, at a communication device, a data packet for sending to a receive end;
   after receiving the data packet, determining, by using a correspondence between a data filtering template information of the data packet and bearer information in forwarding information, a bearer used for forwarding the data packet, and attaching a label to the data packet, wherein the label is used to identify that the data packet is forwarded by using the bearer;
   determining, according to the correspondence between the data filtering template information of the data packet and interface information in the forwarding information stored in the communication device, an interface for forwarding the data packet to the receive end, wherein the data filtering template information of the data packet is IP 5-tuple information, MPLS label information, or VLAN label information in header information of the data packet;
   after the determining the interface for forwarding the data packet, sending the data packet with the label to the interface, and forwarding the data packet through the interface according to the label and by using the bearer;
   forwarding the data packet to the interface; and
   forwarding the data packet through the interface.

2. The method according to claim 1, further comprising:
   receiving forwarding update information sent by a controller; and
   updating the maintained forwarding information according to the forwarding update information.

3. The method according to claim 1, wherein before the forwarding the data packet through the interface, the method further comprises:
   performing data link layer processing and physical layer processing on the received data packet.

4. A forwarding information update method comprising:
   deciding on forwarding information of a data packet that is to be sent to a receive end, wherein the forwarding information comprises a correspondence between data filtering template information of the data packet and an interface of a communications device, and wherein the data filtering template information of the data packet is IP 5-tuple information, MPLS label information, or VLAN label information in header information of the data packet; and
   sending the forwarding information to the communications device;
   wherein the communications device is a base station, the receive end moves from a service range of a first base station to a service range of a second base station;
   deciding on first forwarding update information and second forwarding update information of the data packet sent to the receive end, wherein the first forwarding update information comprises a correspondence between the data filtering template information of the data packet and a first interface of the first base station, so that the first base station sends the data packet to the second base station through the interface; and the second forwarding update message comprises a correspondence between the data filtering template information of the data packet and a second interface of the second base station, wherein the second base station sends the data packet to the receive end through the second interface; and
   sending the first forwarding update information to the first base station, and sending the second forwarding update information to the second base station.

5. The method according to claim 4, wherein after the sending the first forwarding update information to the first base station, and sending the second forwarding update information to the second base station, the method further comprises:
   when a preset trigger condition is met, deciding on forwarding update information of data packets sent to all receive ends in a network managed by a controller, wherein the forwarding update information comprises the correspondence between the data filtering template information of the data packet and the interface of the communications device; and
   sending the forwarding update information to all communications devices in the network managed by the controller.

6. The method according to claim 5, wherein the preset trigger condition is set according to a preset update period and/or a load status of communications devices in the network managed by the controller.

7. The method according to claim 4, wherein the method further comprises:
   deciding on bearer information for sending the data packet, wherein the bearer information comprises a correspondence between the data filtering template information of the data packet and the bearer information for sending the data packet; and
   sending the bearer information to the communications device.

8. A communications device comprising:
   a receiver, wherein the receiver is configured to receive a data packet sent to a receive end;
   a processor;
   a memory storing a program to be executed in the processor, the program comprising instructions to determine an interface for forwarding the data packet to the receive end according to a correspondence between data filtering template information of the data packet and interface information in forwarding information stored in the communications device, wherein the data filtering template information of the data packet is IP 5-tuple information, MPLS label information, or VLAN label information in header information of the data packet;

determine, by using the correspondence between the data filtering template information of the data packet and bearer information in the forwarding information, a bearer used for forwarding the data packet; and attach a label to the data packet, wherein the label is used to identify that the data packet is forwarded by using the bearer; and a transmitter, wherein the transmitter is configured to forward the data packet with the label to the interface, and forward the data packet through the interface by using the bearer.

9. The communications device according to claim 8, wherein the receiver is further configured to receive forwarding update information sent by a controller; and the program comprises further instructions to update the maintained forwarding information according to the forwarding update information.

10. The communications device according to claim 8, wherein the program comprises further instructions to perform data link layer processing and physical layer processing on the received data packet.

11. A controller comprising:

a processor; and a memory storing a program to be executed in the processor, the program comprising instructions to decide on forwarding information of a data packet sent to a receive end, wherein the forwarding information comprises a correspondence between data filtering template information of the data packet and an interface of a communications device, wherein the data filtering template information of the data packet is IP 5-tuple information, MPLS label information, or VLAN label information in header information of the data packet, wherein the communications device is a base station, and the receive end moves from a service range of a first base station to a service range of a second base station, decide on first forwarding update information and second forwarding update information of the data packet sent to the receive end, wherein the first forwarding update information comprises a correspondence between the data filtering template information of the data packet and a first interface of the first base station, wherein the first base station sends the data packet to the second base station through the interface, wherein the second forwarding update message comprises a correspondence between the data filtering template information of the data packet and a second interface of the second base station, wherein the second base station sends the data packet to the receive end through the second interface; and a transmitter configured to send the forwarding information to the communications device;

send the first forwarding update information to the first base station, and send the second forwarding update information to the second base station.

12. The controller according to claim 11, wherein the program comprises further instructions to: when a preset trigger condition is met, decide on forwarding update information of data packets sent to all receive ends in a network managed by the controller, wherein the forwarding update information comprises the correspondence between the data filtering template information of the data packet and the interface of the communications device; and the transmitter is further configured to send the forwarding update information to all communications devices in the network managed by the controller.

13. The controller according to claim 12, wherein the preset trigger condition is set according to a preset update period and/or a load status of communications devices in the network managed by the controller.

14. The controller according to claim 11, wherein the program comprises further instructions to decide on bearer information for sending the data packet, wherein the bearer information comprises a correspondence between the data filtering template information of the data packet and the bearer information for sending the data packet; and the transmitter is further configured to send the bearer information to the communications device.

* * * * *